(No Model.)

S. B. DUNN.
MEANS FOR HEALING PUNCTURES IN PNEUMATIC TIRES.

No. 585,661. Patented July 6, 1897.

Witnesses.
Wm. M. Rheem
Wm. F. Henning

Inventor
S. B. Dunn
Elliott & Hopkins
by Att'ys.

THE NORRIS PETERS CO., PHOTO-LITHO., WASHINGTON, D. C.

UNITED STATES PATENT OFFICE.

SOLA B. DUNN, OF CHICAGO, ILLINOIS.

MEANS FOR HEALING PUNCTURES IN PNEUMATIC TIRES.

SPECIFICATION forming part of Letters Patent No. 585,661, dated July 6, 1897.

Application filed May 18, 1896. Serial No. 591,953. (No model.)

*To all whom it may concern:*

Be it known that I, SOLA B. DUNN, a citizen of the United States, residing at Chicago, in the county of Cook and State of Illinois, have invented certain new and useful Improvements in Means for Healing Punctures in Pneumatic Vehicle-Tires, of which the following is a full, clear, and exact specification.

My invention relates more particularly to tires for use on bicycles, velocipedes, and other vehicles requiring pneumatic tires, and the improvements have especial reference to means for automatically healing or sealing punctures produced in the air jacket or chamber.

The primary object of my invention is to provide a closed cell in the tread side of a tire with a substance of a sufficiently non-solid consistency to ooze into the puncture the instant the puncturing instrument is withdrawn and to be of such a character that another but separated ingredient or element within the tire will cause said substance to harden or clot at the puncture and thus seal the latter and prevent the deflation of the tire, as well as checking the further discharge of the puncture-healing ingredients.

In carrying out my invention I prefer to employ the form of tire in which the pneumatic chamber is removable and composed of a separate tube, but, as will hereinafter appear, it will nevertheless be understood that my invention in its broadest aspect includes a tire of the single-tube variety.

With the aforesaid objects in view my invention consists in certain features of novelty, hereinafter described, and shown in the accompanying drawings, and more particularly pointed out in the claims.

Figure 1:
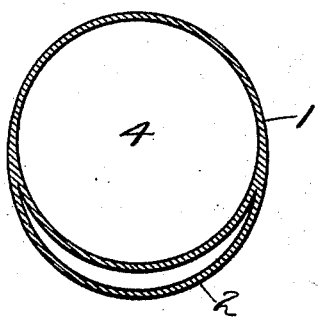
Figure 2:
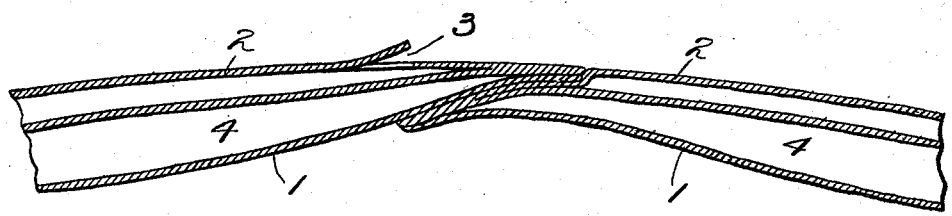
Figure 3:
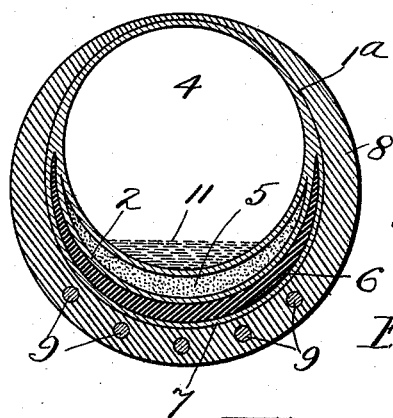
Figure 4:
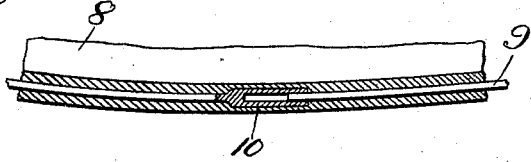
Figure 5:
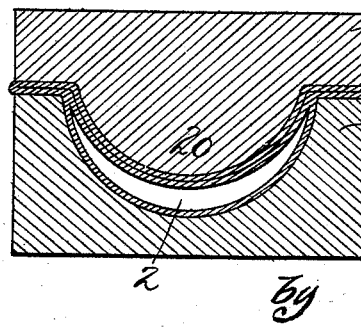

In the said drawings, Figure 1 is a cross-sectional view of the inner tube or air-chamber of a pneumatic tire provided with my improvements. Fig. 2 is a vertical longitudinal section thereof at its meeting or lapped ends. Fig. 3 is a cross-sectional view of a bicycle-tire of the double-tube variety, illustrating a modified form of my invention. Fig. 4 is a longitudinal view of the tread of the outer casing, illustrating the manner of joining the ends of the guard-wires; and Fig. 5 is a cross-section of the inner tube and mold for filling the cell thereof.

In the form of my invention shown in Figs. 1 and 2 I provide the under or tread side of the inner tube or removable air-chamber 1 (shown in Fig. 1) with a longitudinal cell or passage 2, which is preferably formed substantially integrally therewith and extends throughout the length of the inner tube 1, so that by forming an opening such as shown at 3, Fig. 2, in one end of the cell 2 the latter may be filled at pleasure with any suitable material for healing or sealing the puncture as soon as the puncturing instrument is withdrawn. A suitable material for this purpose consists of boiled glue and molasses, making a sort of artificial rubber commonly known as "printers' composition" and which is desirable for this purpose in that it possesses the properties of elasticity and adhesiveness, and, being plastic, the lips of the puncture formed therein will be hermetically compressed together and sealed. It also possesses the further desirable property of hardening upon exposure to the air, and hence any particles of the material or composition that ooze through into the inner lining or tube of the air-chamber 4 will harden on the surface of the inner lining and prevent the deflation of the tire as well as check the further escape of the composition.

A still further advantage of employing the aforesaid composition of matter as a filling for the cell 2 is that it melts at a much lower temperature than the rubber of the tire or casing 1 would melt at, and hence it may be readily poured into the cell 2 by suspending the inner tube from one end without danger of injuring such tube, and a further important advantage of providing a removable inner tube with a composition of this general character is that the entire tube may be removed from the outer casing and boiled or heated at a sufficient degree to melt the composition in the cell 2 without danger of melting the rubber of the tube 1 when it is desired to render the composition in the cell 2 an integral mass after it has received numerous punctures. This may of course be done by simply placing the inner tube 1 in a steamer or in boiling water, the tube being protected from the bottom of the pan and, if desired, being more or less inflated, so as to preserve the contour of the cell 2.

In the form of my invention shown in Fig. 3 the inner tube 1ª is provided with two cells, one under the other, and in the first one of these cells I prefer to locate a small quantity of some powder or comminuted material 5, which shall be of such a character as to combine with the more or less gummy printers' composition 6, contained in the lower cell 7, and thus more quickly harden and form a clot on the gummy substance 6 at the place punctured. This comminuted or powdered material may be prepared chalk, flour, powdered glue, or any other equivalent substance.

In Fig. 3 the inner tube 1ª is shown arranged within the usual outer casing 8, whose tread is provided with a number of longitudinal wires 9, which guard the inner tube and prevent a sharp instrument or object from entirely severing the tire or forming an unusually large rupture therein. These wires have their ends detached, so as to permit the tire to expand lengthwise, and each has one end provided with a socket 10, in which the other end is loosely arranged, so as to go and come with the expansion and contraction.

In the form of my invention shown in Fig. 3 I have also shown the inner tube 1ª provided with a small quantity of liquid 11, the purpose of which is to combine with the powdered material 5 when the tire is punctured and to form a plug or clot at the puncture. This liquid 11 may consist of liquid glue or even water or any other liquid that will perform the function of combining with the material contained in the cell 2 and clog up the puncture when the puncturing instrument is withdrawn.

As a convenient and efficient means for inserting the gummy stratum 6 into the cell 2 of the form of inner tube shown in Fig. 1, I prefer to employ the apparatus illustrated in Fig. 5 and which consists of a mold constituting two parts 18 and 19. The part 18 is grooved longitudinally to receive and hold the cell 2 or tread side of the inner tube in the form it is desired that it shall assume when in operation, while the part 19 is provided with a depending rib 20, which projects downwardly into the said groove of the member 18 and is complementary in form to the top side of the chamber or cell 2 with the tire folded over the latter, as indicated in Fig. 5. The tire is placed in this mold in the manner shown in the drawings, and the gummy substance 6 is run into the cell 2 while in a plastic condition and thus held until it cools sufficiently to retain its form. The plastic gum is admitted to the cell 2 through an open end of such cell, which may afterward be closed, but this is not necessary, and, in fact, both ends of the cell 2 may be left open. Or instead of the described method a sufficient quantity of plastic gummy substance may be run into the cell 2 and the whole inner tube then placed between the blocks 18 19 in the manner shown in Fig. 5 and there held until sufficiently cool to retain its form, the blocks 18 19 in this instance acting as formers to impart the desired shape to the gummy material in the cell 2 and to cause it to be evenly distributed throughout the length of the cell.

Having thus described my invention, what I claim as new therein, and desire to secure by Letters Patent, is—

1. A pneumatic vehicle-tire having in combination two non-solid substances arranged in the tread side thereof and held in separation but which substances when combined are capable of forming a clot for closing the puncture, substantially as set forth.

2. A pneumatic vehicle-tire having in combination a stratum of powder and a quantity of liquid in the tread side thereof held in separation, substantially as and for the purpose set forth.

3. A pneumatic vehicle-tire having in combination a hermetically-sealed cell located at the tread side thereof and being completely filled with a non-solid substance out of contact with air, and another non-solid substance contained within the tire in juxtaposition to but out of contact with said first substance, the said non-solid substances being adapted to form a clot when brought together, substantially as set forth.

SOLA B. DUNN.

Witnesses:
F. A. HOPKINS,
EDNA B. JOHNSON.